T. J. NASH.
STEERING GEAR ATTACHMENT.
APPLICATION FILED NOV. 16, 1915. RENEWED SEPT. 26, 1916.
1,204,683.
Patented Nov. 14, 1916.
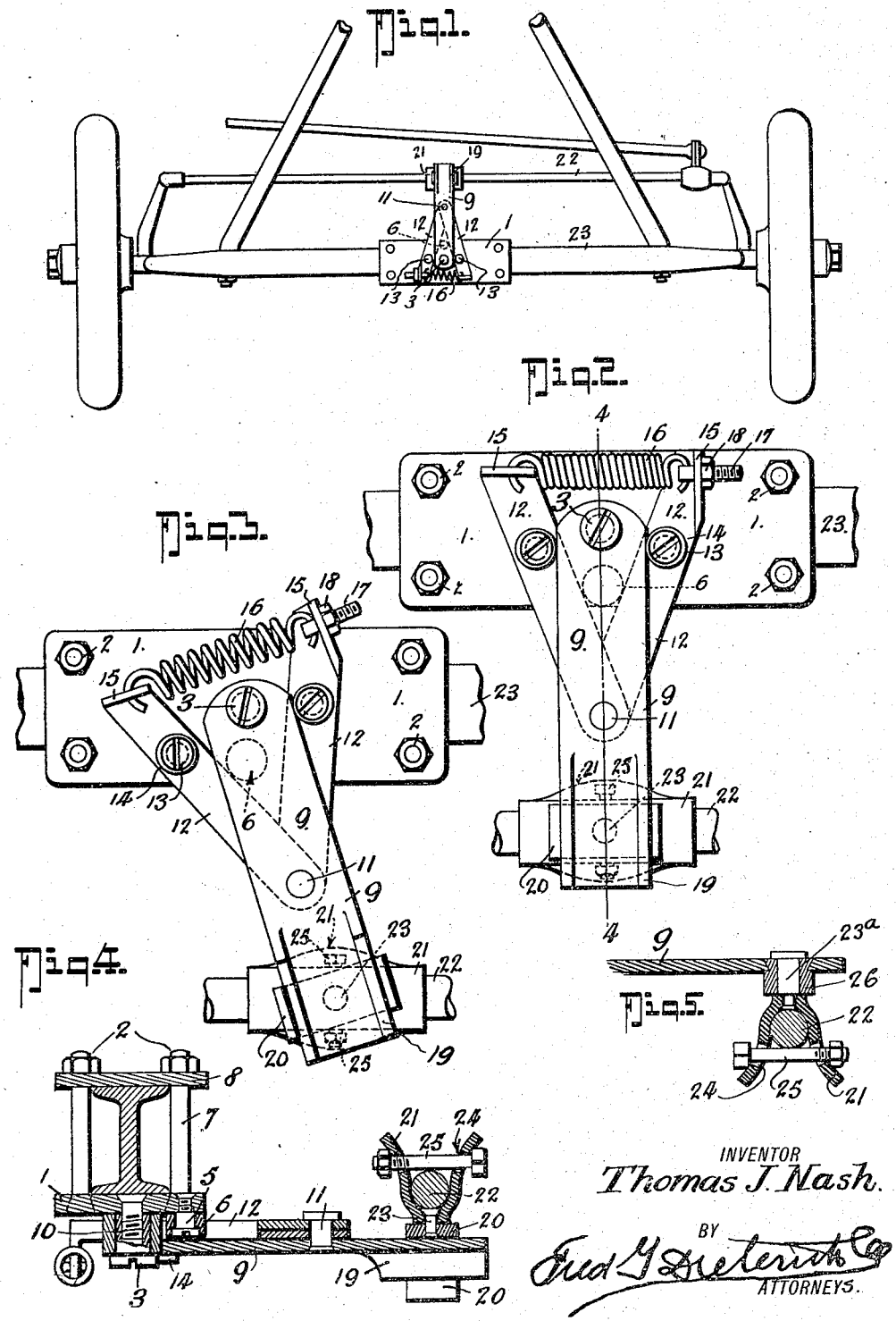
INVENTOR
*Thomas J. Nash.*
BY
*Fred G. Dieterich*
ATTORNEYS.

UNITED STATES PATENT OFFICE.

THOMAS J. NASH, OF LINCOLN, NEBRASKA, ASSIGNOR TO NASH MANUFACTURING COMPANY, OF LINCOLN, NEBRASKA.

STEERING-GEAR ATTACHMENT.

1,204,683.  Specification of Letters Patent.  Patented Nov. 14, 1916.

Application filed November 16, 1915, Serial No. 61,784. Renewed September 26, 1916. Serial No. 122,319.

*To all whom it may concern:*

Be it known that I, THOMAS J. NASH, residing at Lincoln, in the county of Lancaster and State of Nebraska, have invented certain new and useful Improvements in Steering-Gear Attachments, of which the following is a specification.

My invention relates to certain new and useful improvements in attachments for steering gears of automobiles and the like, the object of the invention being to provide a simple, inexpensive and effective device which, when attached to the machine on the front axle and connected to the connecting rod between the steering knuckles, will hold the machine in a straight course and which will allow the steering wheel to be turned in either direction without increased effort.

A further object of the invention is to provide such a device so designed and constructed that whenever the machine is steered in either direction, the tension on the steering gear is equalized so that the pull is practically the same throughout the entire radius of movement.

In its generic nature, the invention resides in providing a plate adapted to be secured to the axle of the vehicle and on which plate there is pivoted an operating or sweep lever that is designed to be connected to the connecting rod of the steering mechanism, the plate also having a relatively fixedly positioned stop against which a pair of spring operated levers are engaged, the spring operated levers being fulcrumed on the operating arm or sweep lever and themselves having stops to engage such lever to tend to restore the operating arm or sweep lever to the normal position in the longitudinal direction.

More subordinately, the invention includes those novel features of construction, combination and arrangement of parts, all of which will be first fully described, then be specifically pointed out in the appended claims, and illustrated in the accompanying drawings, in which:

Figure 1 is an inverted plan view of the front axle and a part of the steering mechanism of an automobile. Fig. 2 is an enlarged inverted plan view of the device which forms the subject-matter of the present invention, and a portion of the connecting rod of the automobile, the parts being in the normal or straightway position. Fig. 3 is a view similar to Fig. 2, showing the connecting rod as moved to one side in turning and the operating lever and one of the buffer levers moved in consequence thereof. Fig. 4 is a section on the line 4—4 of Fig. 2. Fig. 5 is a detail section of a modified form of the invention.

In the drawing, in which like numerals of reference indicate like parts in all of the figures, 1 is the base plate which is secured to the front axle 23, by clip bolts 7 and a cross bar 8, the bolts 7 having nuts 2 for retaining them. Pivoted at 3 on a stud which is secured by a screw 10 to the base 1, is a sweep arm or lever 9 which carries a pivot stud 11 to which the buffer levers 12 are pivoted. Each buffer lever has a screw 13 preferably carrying an eccentric 14 to engage the sweep arm 9 adjacent to its pivot and preferably slightly in advance of the same, the eccentrics 14 being continuously pressed toward each other by a coil spring 16, one end of which is secured in a projection 15 of the other lever 12 by an adjusting bolt 17 and nut 18 whereby the tension of the spring 16 may be varied. It will be observed that by providing the adjusting eccentrics 14 any wear which would cause the eccentrics not to contact with the lever 9 at all times can be taken up and thus rattling avoided.

In the preferred construction, the lever 9 has its outer end formed into a U or channel shape to project into the U shaped member 20 that is swivelly secured by a rivet 23 to the clamp 21, the clamp 21 being of the forked type having diverging arms to straddle over the rod 22 of the steering gear and also being apertured at 24 to receive the bolt 25, by means of which the clamp is fastened in place. As the bolt 25 has its nut tightened up, the outwardly curved arms of the clamp will tend to cause the bolt to engage with the rod 22 and at the same time press the sides of the clamp arms against the rod to insure a firm contact. It will be seen that by projecting the channeled end 19 of the lever 9 into the U shaped member 20, the necessary end and vertical play is provided for. Instead of using this connection, however, I may use the connection shown in Fig. 5, by reference to which it will be seen the clamp 21 is secured to a rivet 23ᵃ that passes through a spacing bushing 26 carried by the lever 9.

In practice, when the vehicle is directed forwardly, the parts will be positioned as shown in Figs. 1 and 2, but when the vehicle is turned to one side or the other, the parts will assume a position such, for instance, as is shown in Fig. 3, but with the lever 9 moved to the right or left, as the case may be.

It will be noticed that by locating the pivot 11 for the levers 12 on the lever 9 and providing the fixed stud 6 to be engaged by the levers 12 and the stop studs 13 for engaging the lever 9 close to its pivot a greater leverage is possible making it permissible to use a lighter spring 16 than has heretofore been the case.

From the foregoing description taken in connection with the accompanying drawings, it is thought the complete construction, advantages and simplicity of the invention will be readily apparent to those skilled in the art.

What I claim is:

1. In a steering mechanism attachment, a plate, means for securing the same to the axle of the vehicle, an operating lever pivoted to the plate, means for securing said lever to the connecting rod of the steering mechanism of a vehicle, a pair of buffer levers pivoted to said operating lever, a stop on said plate and lying between two pivotal points of the operating lever and the buffer levers, means for holding said buffer levers against said stop and stops on said buffer levers to engage said operating lever.

2. In a steering mechanism attachment, a plate, means for securing the same to the axle of a vehicle, an operating lever pivoted at one end to said plate, a connection between said operating lever and the connecting rod of the steering mechanism of a vehicle, a pair of buffer levers pivoted at one end to said operating lever and extending beyond the pivotal end of the same, stops on said buffer levers to engage said operating lever, a coil spring connecting the ends of said buffer levers together and a fixed stop on said support for engagement by said buffer levers under the spring action.

3. In a steering attachment for automobiles, a pivoted arm constructed for connection to a movable part of the steering mechanism, other spring controlled pivot arms movable in opposite directions into opposing engagement with the first mentioned arm, said spring controlled arms being pivoted to said first mentioned arm, a support for fixed attachment to a relatively fixed portion of the vehicle and to which said first mentioned pivoted arm is pivoted, and a stop on said support for engagement by said second mentioned arms under the action of the spring controlling them.

4. In a steering mechanism attachment, a plate, attaching elements for securing said plate to a fixed part of the vehicle, an arm pivoted to said plate and designed to be secured to a movable part of the steering mechanism of the vehicle, a pair of buffer levers pivoted to said arm and extending to either side of the pivot of the same, a fixed stop on said plate with which said buffer levers are designed to engage, means continuously tending to engage said levers with said stop and other means designed to hold one lever inactive while the other lever is engaging said stop when said arm is moved out of the normal position.

5. In a steering mechanism attachment, a plate, attaching elements for securing said plate to a fixed part of the vehicle, an arm pivoted to said plate and designed to be secured to a movable part of the steering mechanism of the vehicle, a pair of buffer levers pivoted to said arm and extending to either side of the same, a fixed stop on said plate with which said buffer levers are designed to engage, means continuously tending to engage said levers with said stop, other means designed to hold one lever inactive while the other lever is engaging said stop when said arm is moved out of the normal position, said last mentioned means comprising stops on said buffer levers for engaging said arm.

6. In a steering mechanism attachment, a plate, means for securing the same to the axle of a vehicle, an operating lever pivoted to the plate, means for securing said lever to the connecting rod of the steering mechanism of a vehicle, a pair of buffer levers pivoted to said operating lever, a stop on said plate and lying between the pivotal points of the operating lever and the buffer levers, means for holding said buffer levers against said stop, stops on said buffer levers to engage said operating lever, said last named stops comprising eccentrics and screws for securing said eccentrics to the buffer levers.

7. In a steering mechanism attachment, a plate, means for securing the same to the axle of a vehicle, an operating lever pivoted at one end to said plate, a connection between said operating lever and the connecting rod of the steering mechanism of a vehicle, a pair of buffer levers pivoted at one end to said operating lever and extending beyond the pivotal end of the same, stops on said buffer levers to engage said operating lever, a coil spring connecting the ends of said buffer levers together and a fixed stop on said support for engagement by said buffer levers under the spring action, and means for taking up wear on said stops to maintain said stops in normal contact with said operating lever.

8. In a steering mechanism, a plate adapted to be secured to a fixed part of the vehicle, an arm pivoted to said plate, a clamp secured to a movable part of the steering mechanism, said clamp and said arm having interprojecting portions for operatively connecting the same, a fixed stop on the plate, buffer levers pivoted to said arm and projecting over the plate, means continuously tending to draw said buffer levers into engagement with said fixed stop, stops on said buffer levers for engaging said arm, said last named stops including adjustable eccentrics.

THOMAS J. NASH.